United States Patent [19]

Turner

[11] 4,200,274
[45] Apr. 29, 1980

[54] FIXTURE FOR HOLDING A FACEPLATE AND A FUNNEL OF A CRT DURING SEALING

[75] Inventor: Clarence C. Turner, Marion, Ind.

[73] Assignee: RCA Corporation, New York, N.Y.

[21] Appl. No.: 952,776

[22] Filed: Oct. 19, 1978

[51] Int. Cl.² ............................................. B23Q 3/00
[52] U.S. Cl. ................................ 269/319; 269/321 T
[58] Field of Search .... 264/321 T, 289 MR, 296–301, 264/303–306, 315–319

[56] References Cited
U.S. PATENT DOCUMENTS

| | | | |
|---|---|---|---|
| 1,886,628 | 11/1932 | Blair et al. | 269/319 |
| 2,826,870 | 3/1958 | Soubier | 269/321 T |
| 3,329,422 | 7/1967 | Hajduk | 269/319 |
| 3,989,233 | 11/1976 | Wardell | 269/303 X |

*Primary Examiner*—Robert C. Watson
*Attorney, Agent, or Firm*—E. M. Whitacre; G. H. Bruestle; L. Greenspan

[57] ABSTRACT

A fixture for supporting and aligning the faceplate and funnel of a CRT while they are being sealed together includes a plurality of alignment structures, at least one of which comprises rotatable rollers on a shaft oriented so that peripheral surface portions of the rollers provide prescribed surfaces for the faceplate and the funnel to bear against to align them.

8 Claims, 5 Drawing Figures

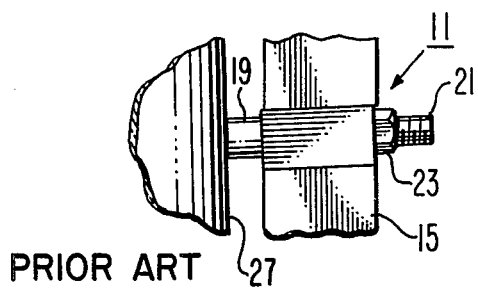
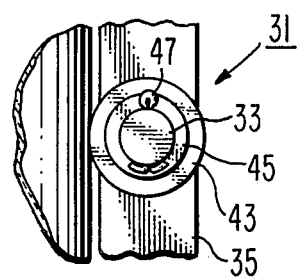
Fig. 1. (PRIOR ART)   Fig. 3.
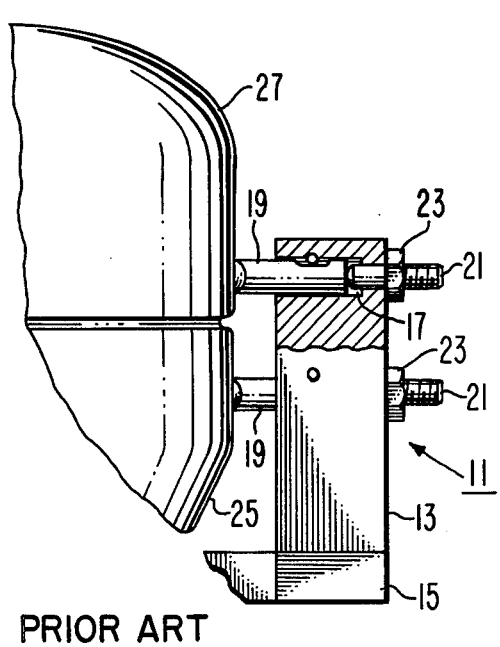
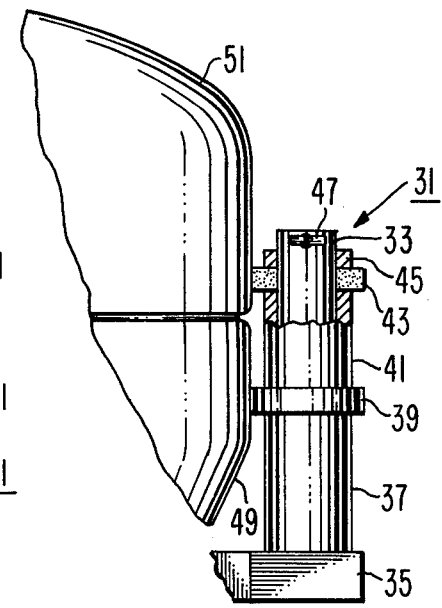
Fig. 2. (PRIOR ART)   Fig. 4.

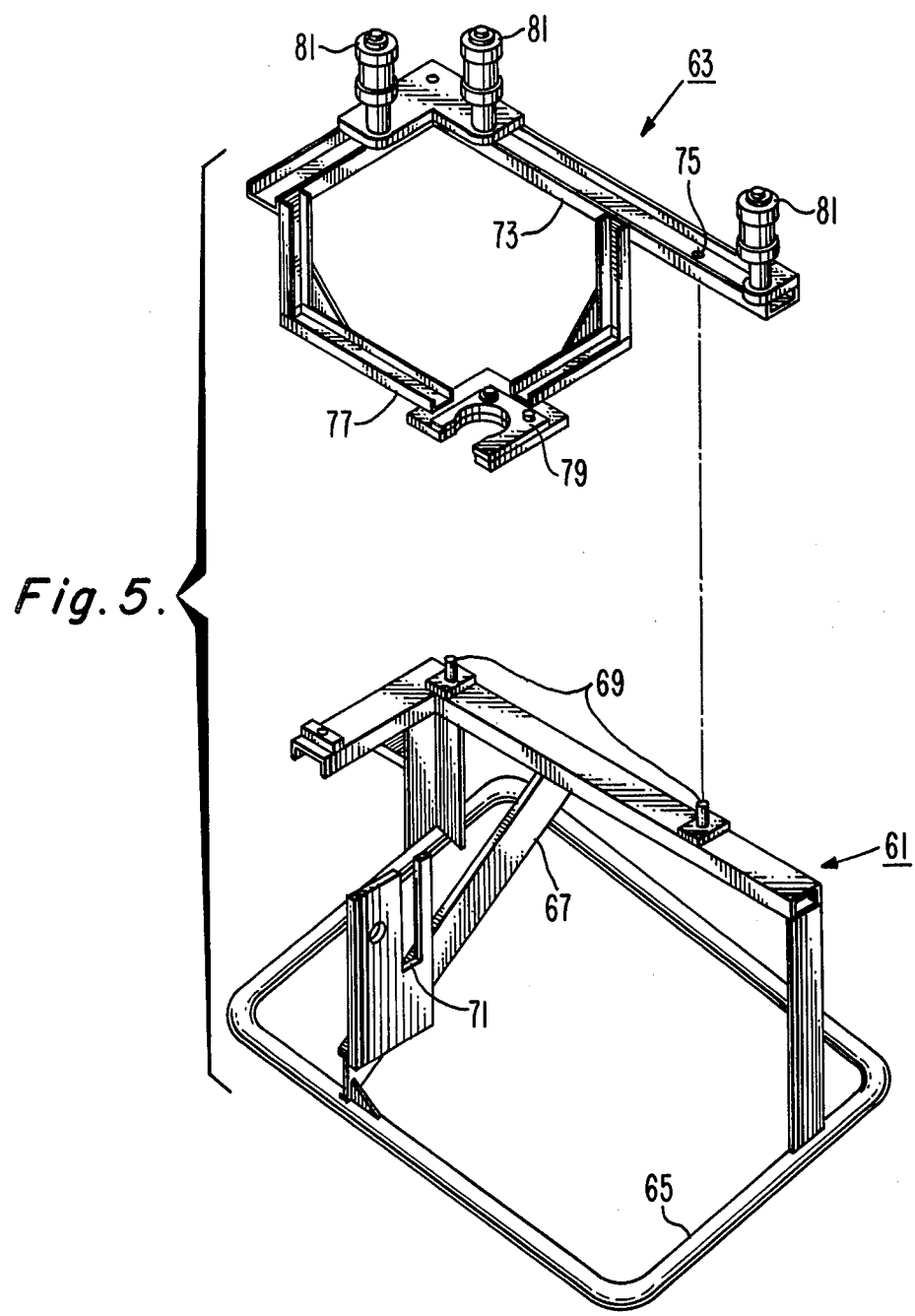

FIXTURE FOR HOLDING A FACEPLATE AND A FUNNEL OF A CRT DURING SEALING

BACKGROUND OF THE INVENTION

This invention relates to a novel fixture for holding a faceplate and a funnel of a CRT (cathode-ray tube) during the time that they are being sealed together, and particularly to such a fixture which has improved structures for aligning the faceplate and funnel with respect to each other.

One type of CRT comprises a glass envelope that is fabricated by sealing the faceplate to the funnel after the viewing screen and other internal structures have been assembled to these parts. In one common practice, a bead of frit material, which is typically a devitrifying glass, is applied to the sealing land of one of the faceplate and the funnel. The sealing land of the other part is then placed in contact with the bead, thereby abutting the sealing land of the one part. The abutting faceplate and funnel which can be in either the faceplate-up or faceplate-down position, are then heated and cooled to cause the frit to hermetically seal the panel and funnel together.

Various fixtures have been described for holding and supporting the faceplate and funnel in aligned abutting relationship during sealing; that is, while they are being heated and cooled. Generally, the fixture comprises a base, a means on the base for supporting a faceplate and a funnel in abutting relationship, and a plurality of alignment structures so attached to and positioned on the supporting means that the faceplate and funnel are in alignment when they bear against prescribed surfaces of the alignment structures.

In prior fixtures, each alignment structure comprises a pair of alignment fingers or pins mounted on a support and extending radially inwardly. The inward surfaces of the fingers are the prescribed surfaces that the faceplate and funnel bear against when they are in alignment. The use of fingers or pins for alignment has several disadvantages. One disadvantage is that they wear rapidly because of the small surface areas that are involved and because of the heating and cooling that they are exposed to. This requires constant checking and readjustment in order to assure the proper faceplate and funnel alignment. In those fixtures in which screws are used to adjust the positions of the fingers, the screws may rotate out of adjustment due to vibration of the fixture during sealing.

SUMMARY OF THE INVENTION

The novel fixture is similar to prior fixtures for the same purpose except that at least one of the prior alignment structures is replaced with an upstanding shaft attached to the supporting means. Rotatable rollers are mounted on the shaft and oriented with peripheral surface portions thereof located to provide the prescribed alignment surfaces. Since each roller is rotatable, and the peripheral surface of the roller is much larger than the inward surface of an alignment finger, the wear is distributed, and adjustment needs to be done less frequently. In preferred forms of the invention, the roller is not adjustable, and when it is worn out of specification, it is simply replaced.

BRIEF DESCRIPTION OF THE DRAWINGS

FIGS. 1 and 2 are fragmentary plan and elevational views respectively of an alignment structure of a prior-art fixture for supporting and aligning parts of a CRT.

FIGS. 3 and 4 are fragmentary plan and elevational views respectively of an alignment structure of the novel fixture.

FIG. 5 is a preferred embodiment of the novel fixture.

DETAILED DESCRIPTION OF THE PREFERRED EMBODIMENTS

There are several different embodiments of fixtures for supporting and aligning parts of a CRT described in the prior art; for example, in U.S. Pat. Nos. 3,118,662 issued Jan. 21, 1964 to G. L. Fassett et al, 3,329,422 issued July 4, 1967 to T. J. Hajduk, and 3,989,233 issued Nov. 2, 1976 to M. H. Wardell. The fixtures disclosed in each of these patents include a frame carrying a plurality of alignment structures, each comprising a pair of pins or fingers which are supported on and extend inwardly from a support.

A typical alignment structure 11 of a prior-art fixture is illustrated in FIGS. 1 and 2. The structure 11 comprises a support 13 carried on a frame 15. The support has a pair of parallel cylindrical holes 17 therein one above the other. A graphite finger 19 is positioned in and extends from one end of each hole 17. A set screw 21 (with a lock nut 23 thereon) is screwed into the other end of each hole 17. When a funnel 25 and panel 27 of a CRT are present in the fixture, selected surfaces thereof bear against the extended ends of the fingers 19. The position of each finger 19 and its extended end may be adjusted by the rotation of the set screw 21. The ends of the fingers 19 wear relatively rapidly. Also, the set screws 21 and the lock nuts sometimes come loose.

One or more of the alignment structures in the prior fixtures may be replaced with the improved alignment structure to provide the novel fixture. An improved alignment structure 31, shown in FIGS. 3 and 4, comprises a shaft 33 carried on a frame 35. The shaft has thereon in order: a cylindrical lower spacer 37, a lower roller 39, a cylindrical upper spacer 41, an upper roller 43, and a washer 45, all held in place by a cotter pin 47 through a hole in the upper end of the shaft 33. The upper and lower rollers 39 and 43 may be made of a refractory material and preferably a refractory nonmetallic material, such as an unglazed ceramic. Some suitable roller materials are graphite, Transite or Marinite (Johns-Manville Co.), in which cases they are preferably about 1.27 cm (0.5 inch) thick with a 3.8 cm (1.5 inch) outside diameter and a 1.9 cm (0.75 inch) inside diameter. The rollers 39 and 43 are preferably made of Supermica No. 1100 (Micalex Corp., Clifton, N.J.), in which case the rollers are preferably 0.32 cm (0.125 inch) thick with the same inside and outside diameters mentioned above. Instead of being of a solid material, the roller may have an outer refractory surface coating or a layer on its outer periphery for contact with the CRT parts on a refractory core. Or, the roller may be made with an inner surface coating or layer of a lower friction material to serve as a bearing in contact with the shaft 33. The shaft 33, lower spacer 37, upper spacer 41, washer 45 and pin 47 are all preferably made of heat-resistant metal or metal alloy.

When a funnel 49 and panel 51 of a CRT are present in the novel fixture, selected surfaces thereof bear against the periphery of the rollers 39 and 41 respectively. The position of the rollers is fixed and is not adjustable, so that wear is the only cause for maladjustment. This can be detected with a simple go-no-go gauge, and the rollers are replaced by a simple operation. However, since the rollers have substantially more surface area than fingers (prior art) and since the rollers can be rotated to present a new surface, the rollers can be used for a substantially greater number of cycles than can fingers.

The preferred embodiment of the novel fixture shown in FIG. 5 is a two-piece assembly adapted for convenient setting up for different CRT sizes. The fixture could be made in one piece. As shown, the fixture comprises a frame base 61 designed to receive one of a family of tops 63. The base 61 includes a rectangular-shaped pipe foot 65 supporting a rigid welded metal frame superstructure 67. A pair of support pins 69 is welded to the upper side of the superstructure 67 and there is a support groove 71 in the superstructure 67 spaced from each of the support pins 69. The groove 71 and the pins 69 define the corners of about a triangle when viewed from above.

The top 63 comprises a rigid welded metal frame body 73 having three important features. First, there are a pair of support holes 75 and a support surface 77 which mate to the support pins 69 and the support groove 71 respectively when the top 63 is mounted on the base. Second, the frame body 73 carries a yoke 79 adapted to engage the funnel of a CRT at about the reference line of the funnel and to support the weight of a funnel and a panel thereon with the longitudinal axis of the funnel tilted at about a 10° angle from vertical. Third, the frame body 73 has on its upper surface three alignment structures 81 designed according to applicant's teaching, and preferably as described above and illustrated in FIGS. 3 and 4. The alignment structures 81 are positioned on the frame body 73 so that when a funnel is present on the yoke 79 with a panel thereon, prescribed areas, called alignment pads, on the funnel and the panel bear against the rollers of the alignment structures as shown in FIGS. 3 and 4. To this end, the longitudinal axis of a funnel and panel present in the fixture is tilted towards the three alignment structures.

I claim:

1. In a fixture for supporting and aligning the faceplate and funnel of a cathode-ray tube while they are being sealed together, said fixture comprising
    (a) a base,
    (b) means on the base for supporting the faceplate and the funnel in abutting relationship,
    (c) and a plurality of alignment structures so attached to and positioned on said supporting means that a faceplate and an abutting funnel present in said supporting means are aligned when they bear against prescribed alignment surfaces of said alignment structure,
    the improvement wherein at least one of said alignment structures comprises an upstanding shaft attached to said supporting means and rotatable rollers nonadjustably mounted on said shaft and oriented with peripheral surface portions thereof located to provide said prescribed alignment surfaces, each roller being rotatable about said shaft in a plane that is substantially parallel to the plane in which the panel and funnel abut.

2. The fixture defined in claim 1 wherein at least the peripheral surfaces of said rollers are of a refractory nonmetallic material.

3. The fixture defined in claim 1 wherein at least the peripheral surfaces of said rollers are of a nonmetallic material selected from the group consisting of graphite and unglazed ceramic.

4. The fixture defined in claim 1 comprising three alignment structures, each structure comprising an upstanding shaft attached to said supporting means and at least two rotatable rollers on said shaft.

5. The fixture defined in claim 1 wherein a faceplate and abutting funnel present in said supporting means are held in a face-up position.

6. The fixture defined in claim 1 wherein said supporting means is fixedly mounted on said base.

7. The fixture defined in claim 1 wherein said supporting means is detachably mounted on said base.

8. The fixture defined in claim 1 wherein said supporting means is tilted at an angle with respect to said base whereby a faceplate and an abutting funnel present in said supporting means are caused by gravity to bear against said prescribed alignment surfaces.

* * * * *